(12) United States Patent
Benoit et al.

(10) Patent No.: US 8,031,319 B1
(45) Date of Patent: Oct. 4, 2011

(54) HERMETIC LIQUID CRYSTAL CELL AND SEALING TECHNIQUE

(75) Inventors: Michael R. Benoit, Holden, MA (US);
Daniel P. Resler, Carlisle, MA (US);
Steven R. Collins, Lexington, MA (US);
Robert D. O'Shea, Harvard, MA (US)

(73) Assignee: Raytheon Company, Waltham, MA (US)

( * ) Notice: Subject to any disclaimer, the term of this patent is extended or adjusted under 35 U.S.C. 154(b) by 333 days.

(21) Appl. No.: 12/474,643

(22) Filed: May 29, 2009

Related U.S. Application Data

(60) Provisional application No. 61/057,518, filed on May 30, 2008.

(51) Int. Cl.
*G02F 1/1339* (2006.01)

(52) U.S. Cl. ........ 349/153; 349/154; 349/187; 349/190; 428/153

(58) Field of Classification Search .......... None
See application file for complete search history.

(56) References Cited

U.S. PATENT DOCUMENTS

| | | |
|---|---|---|
| 4,135,789 A | 1/1979 | Hall |
| 4,418,102 A | 11/1983 | Ferrato |
| 4,545,650 A | 10/1985 | Kirkman et al. |
| 4,684,219 A | 8/1987 | Cox et al. |
| 4,695,490 A | 9/1987 | McClelland et al. |
| 5,241,995 A | 9/1993 | Farrell |
| 5,246,042 A | 9/1993 | Farrell |
| 5,309,263 A | 5/1994 | Sato |
| 5,559,619 A | 9/1996 | Sato |
| 6,013,339 A | 1/2000 | Yamada et al. |
| 6,104,457 A * | 8/2000 | Izumi et al. ............ 349/73 |
| 6,473,148 B1 | 10/2002 | Suh |
| 6,908,026 B2 | 6/2005 | Hanna et al. |
| 6,974,517 B2 | 12/2005 | Hanna |
| 6,988,338 B1 | 1/2006 | Chen et al. |
| 7,046,326 B2 | 5/2006 | Austin et al. |
| 7,166,182 B2 | 1/2007 | Pereira et al. |
| 7,352,428 B2 | 4/2008 | Anderson et al. |
| 7,355,671 B2 | 4/2008 | Anderson et al. |
| 2008/0129945 A1* | 6/2008 | Kim ........................ 349/153 |
| 2009/0044496 A1 | 2/2009 | Botelho et al. |

OTHER PUBLICATIONS

Dorschner, et al.; "Multi-Access Lasercom for Air-Space Communications;" Raytheon Company; Unclassified—Noforn; Oct. 16, 2003; 14 pages.

Dorschner, et al.; "Multi-Access Lasercom Node for Satellite Communications;" Raytheon Company; Unclassified—Noforn; Oct. 16, 2003; 6 pages.

"Electronic Beam Steering in Access Networks;" Milcom:08; Unclassified; Nov. 17, 2008; 26 pages.

Miniscalco, et al.; "Coherent Beam Combining and Optical Space-Time Division Multiple Access;" Proc. Of SPIE; vol. 7814; 78140S-1; downloaded Jan. 11, 2011; 10 pages.

\* cited by examiner

*Primary Examiner* — Hemang Sanghavi
(74) *Attorney, Agent, or Firm* — Daly, Crowley, Mofford & Durkee, LLP

(57) ABSTRACT

Described herein are structures and techniques for providing an LC cell having a hermetically sealed cover disposed over a fill hole provided in a superstrate. The superstrate and cover have adhesion layers disposed thereon. Solder is disposed or otherwise provided around the fill hole (e.g. either on the cover or the superstrate or as a separate piece). The cover is then disposed over the fill hole and the solder is reflowed to form the hermetic seal over the fill hole.

23 Claims, 6 Drawing Sheets

US 8,031,319 B1

HERMETIC LIQUID CRYSTAL CELL AND SEALING TECHNIQUE

CROSS REFERENCE TO RELATED APPLICATION

This application claims the benefit of U.S. Provisional Application No. 61/057,518 filed May 30, 2008 under 35 U.S.C. §119(e) which application is hereby incorporated herein by reference in its entirety.

STATEMENT REGARDING FEDERALLY SPONSORED RESEARCH

This invention was made with Government support under Contract FA9453-05-C-0238 awarded by the Air Force Research Laboratory. The Government may have certain rights in the invention.

FIELD OF THE INVENTION

The structures and techniques described herein relate to electronically scanned array antennas and more particularly to optical phased arrays (OPAs).

BACKGROUND OF THE INVENTION

As is also known in the art, liquid crystals (LC's) cells are typically formed by mating together two plates of glass (or other suitable material) and sealing the edges to form a cavity between the two glass plates. One piece of glass is formed or otherwise provided having a so-called fill hole provided therein. Once the cavity is formed, liquid crystal material is introduced into the cavity through the fill hole. After filling the cavity, the fill hole is closed.

In some applications (e.g. space-based applications), a hermitically sealed LC cell is required. Thus, for such applications, a hermetic seal and associated manufacturing process is needed that does not reduce the LC performance or compromise reliability.

There are many ways to form hermetic edge seals around the cell before the LC is introduced. Glass frit has been used to "weld" two glass panels together to form the cavity into which liquid crystal material is introduced through the fill hole. However, the fill hole still remains open and the temperatures needed to melt the frit and thus close the fill hole are too high for the LC material introduced into the cavity. Soldering can also be used to provide a hermetic edge seal, but also does not solve the fill hole problem.

U.S. Pat. No. 4,135,789 describes sandwiching glass beads between a Teflon plug in the fill hole and a metal cover. In this approach, the cover is heated by induction to melt the glass beads and the Teflon plug protects the LC.

U.S. Pat. No. 4,418,102 describes how epoxy can be used to close the fill hole. There are at least three problems with this approach for the application of high performance LC cells (e.g. LC cells which may be used in space-based applications). The first problem is that epoxies do not create true hermetic seals and can provide leakage paths in a vacuum environment. The second problem is the fact that epoxies out gas. Both of these failure mechanisms are fundamental issues in space-based applications. The third problem is long-term interaction between the epoxy and the liquid crystal. High performance LC's used in optical phased array (OPA) technology, for example, has shown detrimental interaction with standard LC epoxies.

Thus, to use high performance liquid crystals (LC's) in a space environment, a hermetic seal and associated manufacturing process is needed that does not reduce the LC performance or compromise reliability. Conventional techniques for sealing LC cells and panels involves either epoxies or plug techniques both of which have been found incompatible with some high performance LC's used in optical phased array (OPA) technology.

SUMMARY OF THE INVENTION

It has been recognized that previous attempts to provide a hermetic seal include the use of organic materials or reactive gases in contact with the LC. It has also been discovered that flourene in Teflon is very reactive to high performance LCs.

In accordance with the present structures and techniques described herein is a hermetic seal technique that does not introduce any organic materials in contact with the liquid crystal and is done with a localized heat source that doesn't damage the LC. This is achieved through the use of a soldered layer (e.g. an indium soldered cover). While a superstrate and cover of an LC cell are being fabricated and coated, adhesion layers are deposited or others was provided on the superstrate around the fill hole and on the cover. The adhesion layers may be provided for example from Ti—Ni—Au. Solder is disposed on the cover or on the superstrate around the region of the fill hole or otherwise (e.g. by either providing the solder on the cover or introducing the solder as a preform solder ring). The cover is then placed over the fill hole. In some embodiment, this may be done in an Argon atmosphere. The solder is then melted to seal the cover to the superstrate of the LC cell. In one embodiment, the solder is heated to cause it to reflow and thereby create a hermetic seal. In one embodiment, the solder may be caused to reflow by heating the cover to a sufficient temperature (e.g. by applying a heated probe to the cover). In one embodiment, the solder reflow operation may take place in an atmosphere of inert gas. In one embodiment, the solder reflow operation takes place in an Argon atmosphere. The Argon atmosphere helps prevent any oxidation or any long term reactions with the LC. The Argon also fills the expansion chamber and allows the LC to expand without distorting the cell. Thus, a hermetic seal technique in which only inert materials are in contact with the LC is provided. This is preferred with high performance liquid crystals that are not robust against contamination. The combination of the localized heating and optionally an Argon atmosphere provides the inert chamber and seal.

In accordance with the present structures and techniques described herein, an LC cell having a hermetic seal includes a superstrate and a cover. The superstrate and cover have adhesion layers of Ti—Ni—Au deposited around the fill hole and on the cover. Solder (e.g. Indium) is disposed or otherwise provided on the cover or the superstrate in the region of the fill hole. The cover is then disposed over the fill hole in an Argon atmosphere. The LC cell is heated to a temperature below the melting point of Indium and a heated probe is brought down on the cover thereby causing the Indium to reflow and forming a hermetic seal over the fill hole.

By providing an LC cell having a hermetic seal which does not include the use of organic materials or reactive gases in contact with the LC, a high performance LC cell suitable for spaced-based and other long-term applications is provided. The use of Ti—Ni—Au adhesion layers deposited around the fill hole and on the cover, indium disposed on the cover and the cover disposed over the fill hole results in a hermetic seal in which only inert materials are in contact with the LC while avoiding problems caused by out-gassing and long-term interaction between epoxy and liquid crystal. Thus, the use of a cover and solder results in a hermetic seal that does not introduce any organic materials in contact with the liquid crystal and is done with a localized heat source that doesn't damage the LC.

In accordance with a further aspect of the concepts described herein, a liquid crystal (LC) cell includes a substrate disposed over a superstrate having a fill hole provided therein. One or more spacers are disposed between the superstrate and substrate to space apart a surface of the substrate from a surface of the superstrate and a sealant material is disposed on edges of the superstrate and substrate so as to form a cavity region between the superstrate and said substrate. A liquid crystal material is disposed in the cavity region via the fill hole. The superstrate has an adhesion layer disposed on a first surface thereof about the fill hole and a cover having a cover adhesion layer disposed thereon is disposed over the fill hole. A solder material is disposed between the cover and the superstrate to provide a hermetic seal over the fill hole.

In one embodiment, the fill hole is provided having a diameter selected such that the volume of the fill hole accommodates an expected expansion of the LC material the LC material is heated to within a predetermined range of temperatures. In one embodiment, the fill hole has a counter-bore portion.

In one embodiment, the LC material fills the cavity region and at least a portion of the fill hole in said superstrate.

In one embodiment, either one or both of the cover adhesion layer and superstrate adhesion layer are provided as Ti—Ni—Au.

In one embodiment, the cover is provided from a material having a coefficient of thermal expansion which substantially matches a coefficient of thermal expansion of the superstrate. In one embodiment, the cover and the substrate are provided from substantially the same material while in other embodiments, the cover and the substrate are provided from different materials. In one embodiment, the cover is provided from a material having a thermal conductance which is not lower than a thermal conductance of the superstrate. In one embodiment, the cover is provided from a material having a thermal conductance which is not more than twenty percent lower than a thermal conductance of the superstrate.

In a further aspect of the concepts described herein a process for forming a hermetic seal on a liquid crystal (LC) cell includes providing a superstrate adhesion layer around a fill hole provided in a superstrate, providing a cover adhesion layer on a surface of a cover, arranging solder on at least one of: the surface of the cover having the cover adhesion layer disposed thereon and the surface of the superstrate having the superstrate adhesion layer disposed thereon, mating the superstrate with a substrate to form an LC cavity, filing the cavity with an LC material through the fill hole in the superstrate, disposing the cover over the fill hole such that the cover adhesion layer is disposed over the superstrate adhesion layer and reflowing the solder to form a hermetic seal over the fill hole.

In one embodiment, the process of reflowing the solder to form a hermetic seal over the fill hole includes disposing the LC cell on a heat sink and heating the solder to reflow the solder and thereby form a hermetic seal over the fill hole. In one embodiment, the solder is heated by applying a heated probe applied to the cover. In one embodiment, the cover adhesion layer is provided as Ti—Ni—Au and the superstrate adhesion layer is provided as Ti—Ni—Au and solder is provide as Indium. In one embodiment, the adhesion layers are provided while the superstrate and cover are being fabricated and coated.

In one embodiment, the solder is reflowed by heating the LC cell and heating the solder to form a hermetic seal over the fill hole. In one embodiment, the cover adhesion layer is provided as Ti—Ni—Au, the superstrate adhesion layer is provided as Ti—Ni—Au and the solder comprises Indium or an Indium alloy disposing on at least a portion of a surface of a first one of the cover and the superstrate.

In one embodiment, the solder is reflowed by applying a focused heat source to the solder. In one embodiment, the focused heat source corresponds to a heated probe applied to at least one of the cover, the superstrate or the solder.

In one embodiment, the LC cell, including the fill hole, is immersed in an inert gas prior to disposing the cover over the superstrate. In one embodiment, the LC cell is immersed in an Argon atmosphere.

In one embodiment, disposing solder on at least a portion of a surface of the cover or the superstrate comprises disposing at least one of: (a) a pure metal; (b) Indium; or (c) an alloy.

In one embodiment, disposing solder on at least a portion of a surface of the cover or the superstrate comprises disposing the solder as a pre-form ring.

BRIEF DESCRIPTION OF THE DRAWINGS

The foregoing features of the concepts, structures and techniques described herein may be more fully understood from the following description of the drawings in which.

DETAILED DESCRIPTION OF THE PREFERRED EMBODIMENTS

Figure 1:
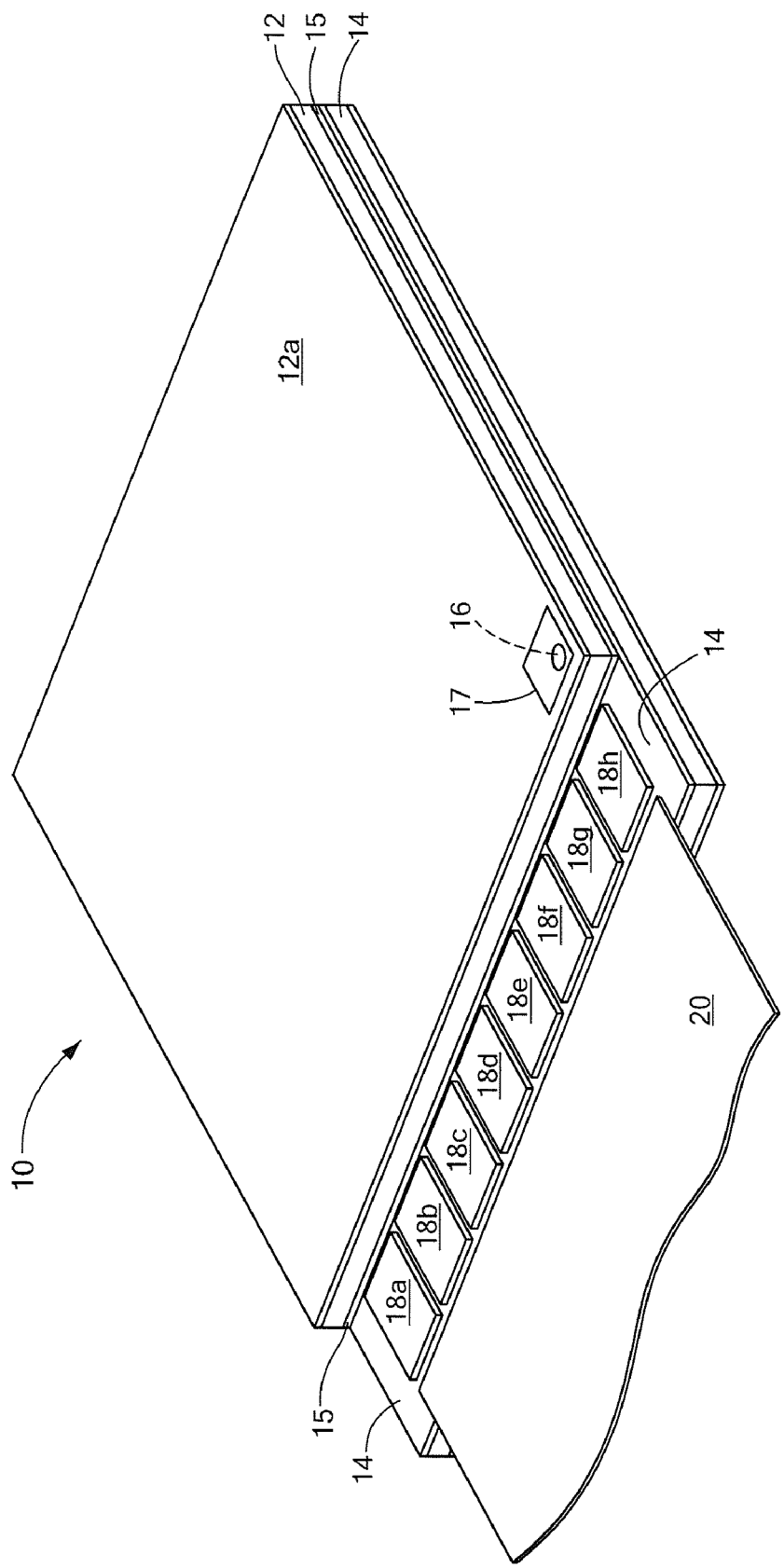
FIG. 1 is an isometric view of an LC cell having a hermetically sealed fill hole.
Figure 2:
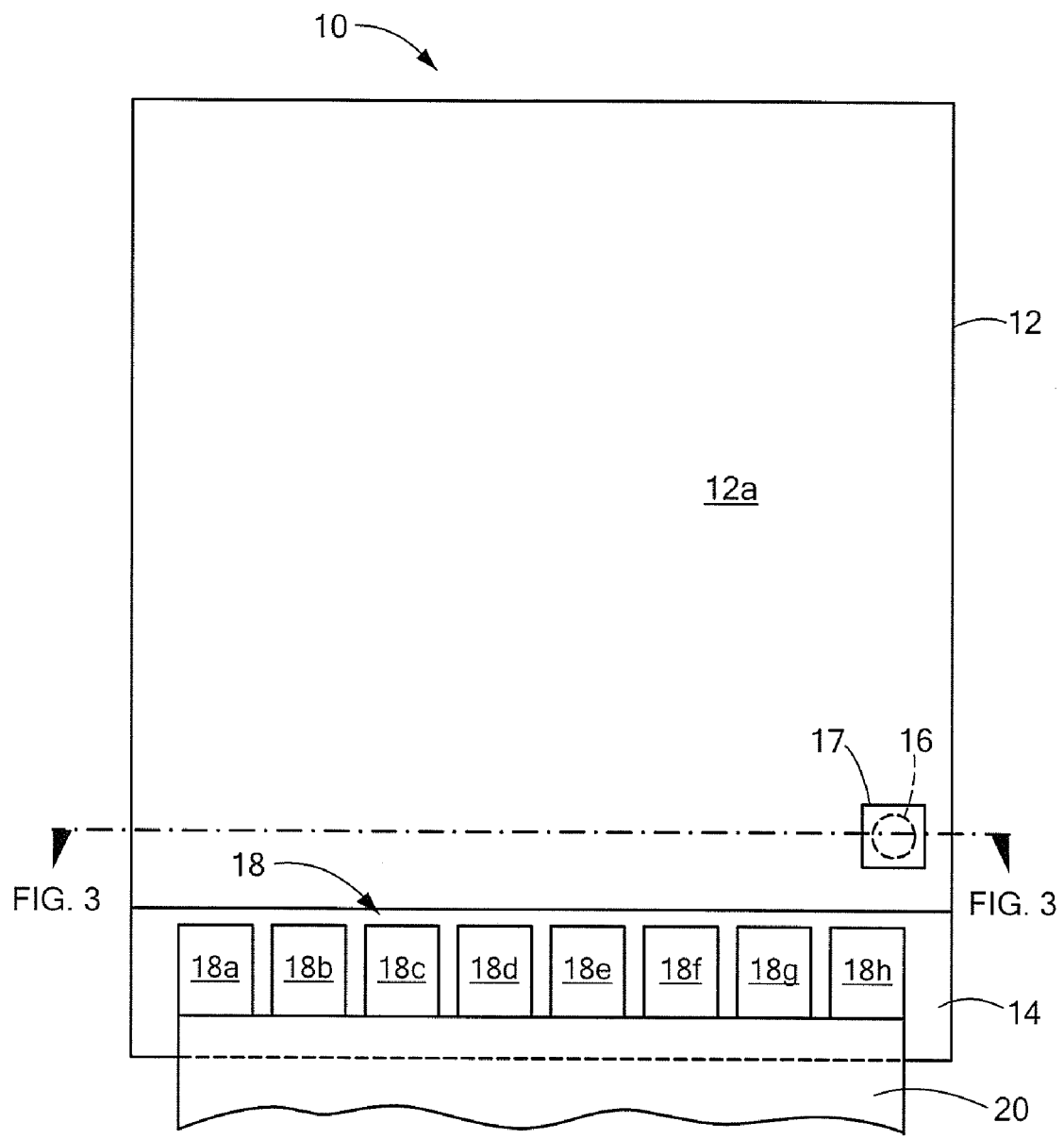
FIG. 2 is a top view of the LC cell of FIG. 1.

Referring now to FIGS. 1-3A in which like elements are provided having like reference designations throughout the several views, a liquid crystal (LC) cell 10 includes a superstrate 12 disposed over a substrate 14. In one embodiment, superstrate 12 and substrate 14 may be provided from any material which is substantially transparent in a wavelength of interest. Such materials, include but are not limited to glass, sapphire, spinel, fused silica, GaAs, etc). In some applications, it may be desirable to provide superstrate and/or substrate from a material which reflects a wavelength of interest (e.g. such that the superstrate and/or substrate act as a mirror).

As will be described in further detail in conjunction with FIG. 3 below, hermetically sealed sidewalls 15 formed around the edges of superstrate 12 and substrate 14 form a cavity region 22 (FIG. 3) into which liquid crystal 25 (FIG. 3) is disposed through a fill hole 16. In the embodiment shown in FIG. 1, sidewalls 15 are provided in manner to be described below in conjunction with FIG. 3. It should be appreciated, however, that sidewalls 15 may also be provided using any conventional technique.

For reasons which will become apparent from the description hereinbelow, a cover 17 is disposed over a so-called fill hole 16 provided in superstrate 12. Preferably, cover 17 is secured to superstrate 12 via a hermetic seal between a surface of cover 17 and superstrate surface 12a. In preferred embodiments, cover 17 is provided from the same material as superstrate 12. In other embodiments, however, the materials need not be the same. Regardless of whether the cover and superstrate materials are the same or different, it is desirable that the coefficient of thermal expansion (CTE) of the cover material match the CTE of the superstrate material to avoid undue stress on the seal between cover 17 and superstrate 12. Also, cover 17 may be provided having any regular or irregular shape (e.g. oval, circular, annular, rectangular, square, triangular, octagonal or any other shape). In some embodiments, cover 17 is provided having a thickness in the range of about 0.1 to about 0.5 mm with a thickness in the range of about 0.2 mm to about 0.3 mm being preferred.

LC cell 10 also includes one or more control circuits 18a-18h, generally denoted 18 disposed on substrate 14. Control circuits 18 receive signals provided thereto via signal path 20, and provide control signals to conductors (not visible) disposed on substrate 14 of LC cell 10. Signal path 20 may be provided, for example, as a flex cable coupled to a controller or other signal source (not visible in FIG. 1).

Figure 3:
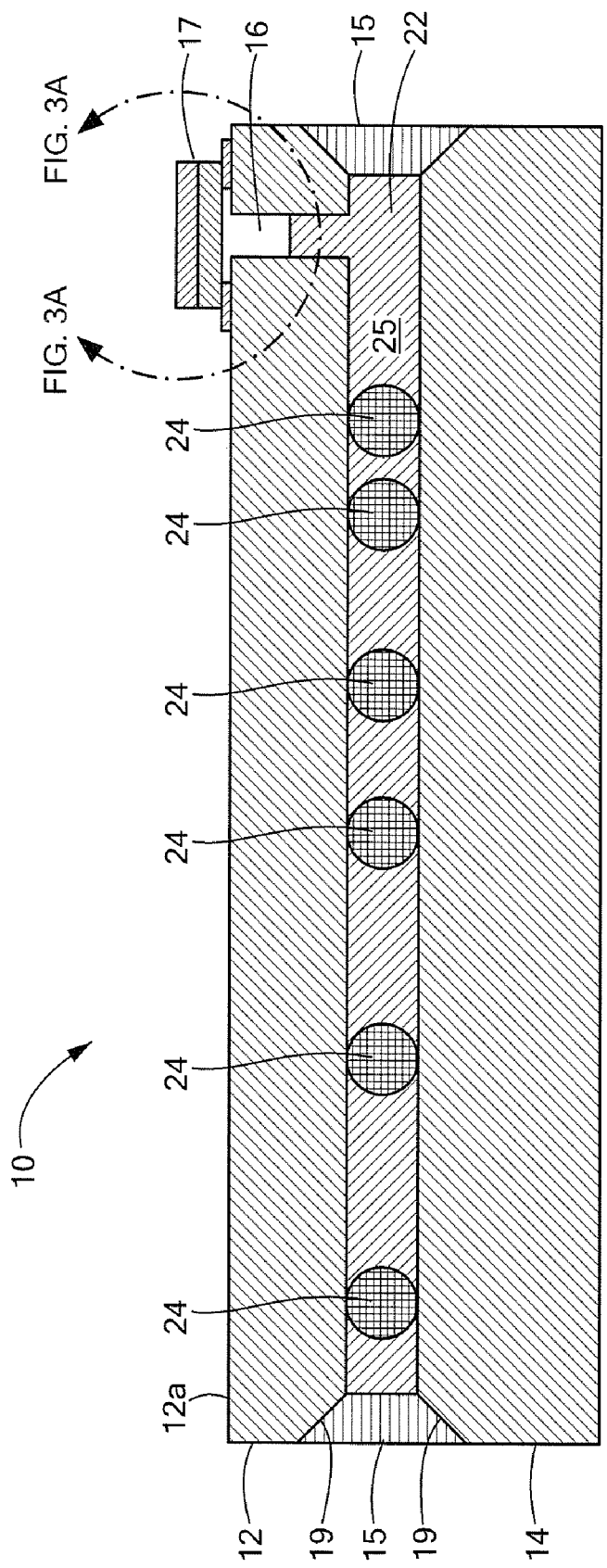
FIG. 3 is a cross-sectional view of the LC cell of FIG. 1 taken across lines 3-3 in FIG. 2.
Figure 3A:
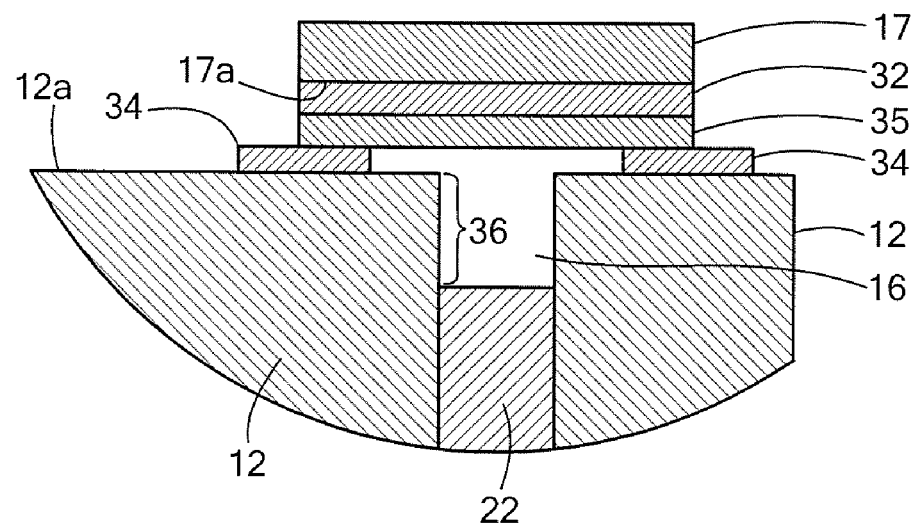
FIG. 3A is a cross-sectional view of the LC cell of FIG. 3 taken across lines 3A-3A in FIG. 3.

Referring now to FIGS. 3 and 3A, each of superstrate 12 and substrate 14 are provided having angled surfaces 19 which form a space into which a sealant is disposed to provide sidewalls 15. The sealant couples superstrate 12 and substrate 14 and forms sidewalls 15 for cavity region 22. The sidewalls may also be provided using a glass frit technique, a solder technique or any other technique known to those of ordinary skill in the art to provide a hermetic edge seal around the edge of the LC cell 10. In one embodiment, the perimeter seal is provided from an epoxy which is pointed or otherwise deposited in the space formed by angled surfaces 19 along the perimeter of the superstrate and the substrate.

Spacers 24 disposed between superstrate 12 and substrate 14 space apart the superstrate 12 and substrate 14 by a substantially known and uniform distance. The spacers may be distributed between the superstrate and substrate by spin coating or otherwise depositing the spacers on a surface of the superstrate or the substrate to establish a gap between the two plates.

Once cavity region 22 is formed, it is filled with liquid crystal material 25 via the fill hole 16 provided in superstrate 12. As can be seen most clearly in FIG. 3A, the liquid crystal material fills at least a portion of fill hole 16. The liquid crystal material expands when heated to an operating temperature and at least a portion of the fill hole 16 serves as an expansion chamber 36 (FIG. 3A) having a volume which allows the LC material 25 to expand (e.g. during operation) without distorting the cell. Thus, the volume of the fill hole 16 is selected to ensure that the liquid crystal material can expand without distorting the LC cell 10 or exerting an undue force on cover 17. Undue force is considered to be an amount of force which would deflect, in any way, the optics of the LC cell. It should be appreciated that the size of the expansion region may be computed based upon temperatures, coefficients of thermal expansion of the liquid crystal material and the amount of liquid crystal material within the cavity.

The volume of the fill hole is determined by the fill hole length (which typically is the same as the superstrate thickness) and the fill hole diameter (or effective cross-sectional area in the case where the fill hole is not round).

Factors to consider when selecting a diameter of the fill hole include but are not limited to: the volume of the LC in the cell taking into account LC volume expansion (e.g. due to heating); thickness of the superstrate (it is desirable for the superstrate to be as thin as possible); material availability; the application in which the LC cell will be used; the size of the device (because the liquid crystal expands to a different amount depending upon the amount of liquid crystal in the cavity). It is, of course, desirable for the diameter of the fill hole to not occupy too much of the cell aperture.

As may be clearly seen in FIG. 3A, in a preferred embodiment, fill hole 16 has a portion 36 (referred to as expansion chamber 36). In preferred embodiments, at least a portion of expansion chamber 36 remains empty of LC material 25 even when the LC material 25 is heated to an operating temperature.

As can also be seen in FIG. 3A, superstrate 12 and cover 17 each have adhesion layers (e.g. thin film metals) 32, 34 deposited or otherwise provided on respective surfaces thereof. In one embodiment, the adhesion layers are provided having a thickness which is typically less than about 0.3 um. Of course, other ranges are possible (e.g. about 0.15 um to about 0.5 um). Cover adhesion layer 32 is disposed on a surface 17a of cover 17 and superstrate adhesion layer 34 is disposed on surface 12a of superstrate 12. Solder 35 is disposed between the cover 17 and superstrate 12 and more particularly between adhesion layers 32, 34. Solder 35 may be provided from a substantially pure metal such as Indium or as an alloy (e.g. an Indium alloy). Solder 35 may be provided having a thickness in the range of about 10 microns to about 20 microns with a thickness of about 14 microns being preferred.

In one embodiment, a layer of solder 35 is applied or otherwise disposed on at least a portion of the cover or on at least a portion thereof the superstrate 12 in at least a region around fill hole 16 and adhesion layers 32, 34. In other embodiments, solder 35 may be provided as a preformed piece of solder having a particular shape (e.g. a circular, annular, rectangular or any regular or irregular shape) and disposed about the fill hole 16. It should also be appreciated that solder 35 may be provided as part of adhesion layer 32 or as part of adhesion layer 34. In one embodiment, Indium is preferred for use as solder 35 since it has a melting point which is relatively low compared with melting points of other solder materials. Preferred solders are those having a melting point which are low enough such that they do not reduce the chemical integrity of the liquid crystal material 25 or introduce undesirable mechanical stress on the cover, superstrate or other portion of the LC when it is heated for solder reflow. It should thus be appreciated that solder may be disposed on either the cover or the superstrate (e.g. as part of one or both of adhesion layers 32, 34) and that the cover is then disposed over the fill hole.

In optional embodiments, the cover is disposed over the fill hole while surrounded by an inert gas atmosphere. In one embodiment, the fill hole is surrounded by an Argon atmosphere.

Once the cover is positioned over the fill hole and the solder is disposed between the adhesion layers of the cover and superstrate, the solder is heated (e.g. by heating the cover 17 or the superstrate 12 or by heating both the cover and the superstrate) to a temperature which causes it to reflow thereby forming a hermetic seal over fill hole 16. By providing an LC cell having a hermetic seal which does not include the use of organic materials or reactive gases in contact with the LC, a high performance LC cell suitable for spaced-based and other long-term applications is provided.

In one embodiment, the adhesion layers 32, 34 are provided from Ti—Ni—Au. The use of Ti—Ni—Au adhesion layers deposited around the fill hole and on the cover with solder disposed therebetween results in a hermetic seal over fill hole 16. This technique thus avoids problems caused by out-gassing and long-term interaction between epoxy materials and liquid crystal. In some embodiments, only inert materials are in contact with the LC.

It should be appreciated that a variety of different materials and material combinations may be used to provide an LC cell. Some exemplary material combinations for two different metalization systems (one which incorporates tin (Sn) and the other which incorporates nickel (Ni)) are shown in Table 1 below. Details of the thermal process and fill hole cover material are adjusted depending upon the particular substrate material used in the combination.

TABLE 1

| Combination Number | Substrate | Superstrate | Thickness (mm) | Superstrate Metallization | Cover Material | Cover Metallization |
|---|---|---|---|---|---|---|
| 1 | Fused Silica | Fused Silica | 3 | Ti—Ni—Au | Fused Silica | Ti—Ni—Au—In |
| 2 | Fused Silica | Fused Silica | 3 | Ti—Sn—Au | Fused Silica | Ti—Sn—Au—In |
| 3 | Sapphire | Sapphire | 2 | Ti—Ni—Au | Sapphire | Ti—Ni—Au—In |
| 4 | Sapphire | Sapphire | 2 | Ti—Sn—Au | Sapphire | Ti—Sn—Au—In |
| 5 | Spinel (poly) | Spinel (single) | 2 | Ti—Ni—Au | Sapphire | Ti—Ni—Au—In |
| 6 | Spinel (poly) | Spinel (single) | 2 | Ti—Sn—Au | Sapphire | Ti—Sn—Au—In |

The particular combination of superstrate-substrate-cover and metallization materials to use in any particular application is selected in accordance with the needs of the application. For example, sapphire has a thermal conductivity which is higher than that of fused silica. Thus, if the cover is provided from sapphire, then it would be desirable to also provide the superstrate from sapphire to thus facilitate solder reflow between the cover and superstrate.

Also, a trade-off must be made between selection of solder materials (e.g. indium (In), tin (Sn), gold (Au), copper (Cu), etc. . . . and all alloys thereof) and the maximum heat required to reflow the solder and provide a hermetic seal. In general, it is desired to utilize solders and material combinations which allow reflow of solder and formation of a hermetic seal at temperatures below any temperature which would cause the LC material to react. A process in which tin (Sn) is used permits lower temperatures to be used.

Corresponding temperatures, forces and process times for each of the different material combinations in Table 1 are shown in Table 2 below.

TABLE 2

| Combination Number | Peak Probe Temp (° C.) | Ramp Rate (° C./min) | Probe Force (lb) | Time Map |
|---|---|---|---|---|
| 1 | 275 | 50 | .5 | Time 0 climb from 50-75<br>Time 30 climb from 75-100<br>Time 60 climb from 100-125<br>Time 90 climb from 125-150<br>Time 120 climb from 150-175<br>Time 150 climb from 175-200<br>Time 180 climb from 200-225<br>Time 210 climb from 225-250<br>Time 240 climb from 250-275<br>Time 360 LIFT |
| 2 | 200 | 50 | .5 | Time 0 climb from 50-100<br>Time 60 climb from 100-150<br>Time 120 climb from 150-200<br>Time 240 LIFT |
| 3 | 350 | 100 | .5 | Time 0 climb from 50-150<br>Time 60 climb from 150-250<br>Time 120 climb from 250-350<br>Time 240 LIFT |
| 4 | 225 | 100 | .5 | Time 0 climb from 50-150<br>Time 60 climb from 150-225<br>Time 180 LIFT |
| 5 | 310 | 100 | .5 | Time 0 climb from 50-150<br>Time 60 climb from 150-250<br>Time 120 climb from 250-310<br>Time 240 LIFT |
| 6 | 200 | 100 | .5 | Time 0 climb from 50-150<br>Time 60 climb from 150-200<br>Time 180 LIFT |

The column labeled "Probe Force" in Table 2 represents the force used when ands LC cell is disposed in spring loaded heat sink so it is possible to avoid applying excess force to an LC cover. It should also be appreciated that the column labeled "Time Map" in Table 2 represents temperature ramps used to avoid a violent reaction with either the solder or the liquid crystal material.

It should be appreciated, of course, that other material combinations (i.e. other than those shown in Table 1) are also possible. In this case, different temperatures, forces and process times (i.e. other than those shown in Table 2) may be required.

Figure 3B:
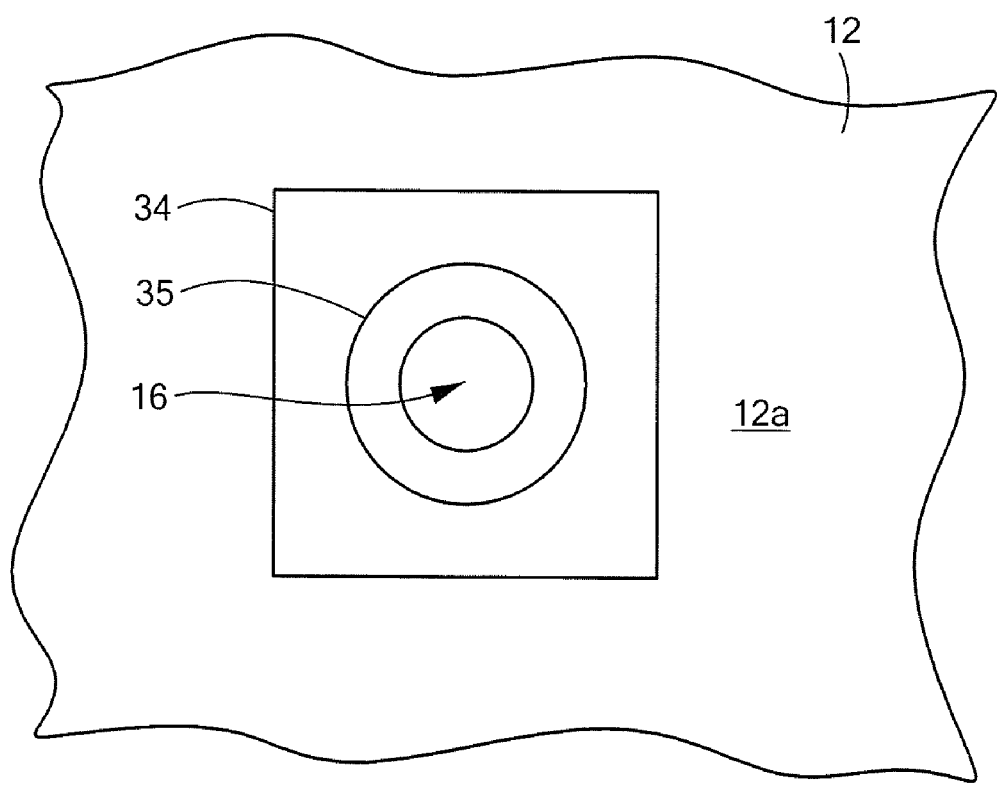
FIG. 3B is a top view of a portion of an LC cell.

Referring briefly to FIG. 3B, an adhesion layer 34 is disposed around a fill hole 16 aperture provided in surface 12a of a superstrate 12. A preform ring of solder 35 is disposed over adhesion layer 34. In preferred embodiments, the cover adhesion layer would substantially match the size and shape of the superstrate adhesion layer 34.

Figure 4:
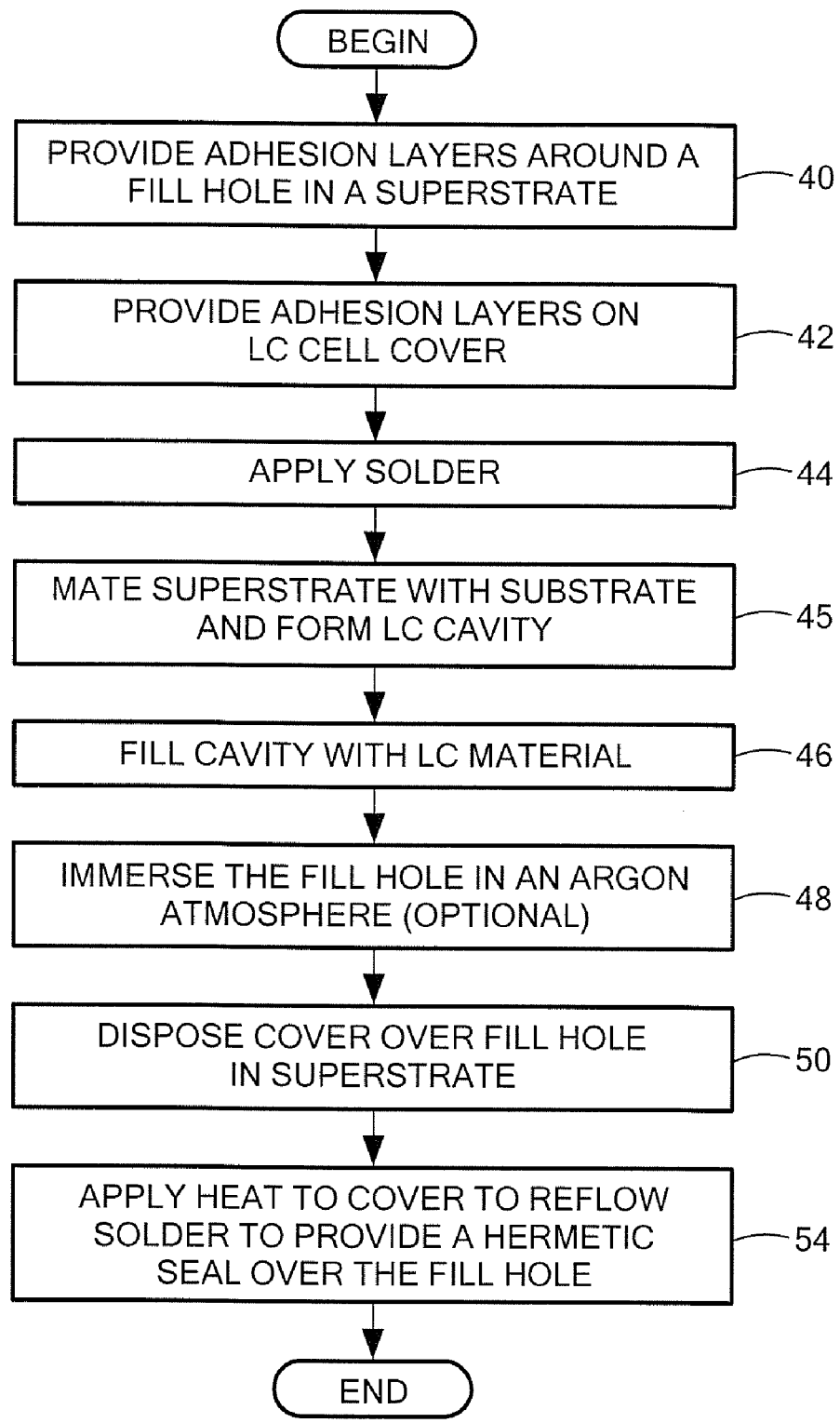
FIG. 4 is a flow diagram of a process to form a hermetic seal of a fill hole in a liquid crystal (LC) cell.

Referring now to FIG. 4, as shown in processing blocks 40, 42, a technique for providing a hermetic seal around a fill hole of an LC cell begins by depositing or otherwise providing an adhesion layer on a surface of a superstrate. As discussed above, the superstrate (and/or a substrate) may be provided from materials, including but not limited to: glass, sapphire, spinel, fused silica, GaAs, and the like. In some applications, it may be desirable to provide the superstrate and/or substrate from a material which reflects a wavelength of interest (e.g. such that the superstrate and/or substrate act as a mirror). The adhesion layer is provided on at least on a portion of the superstrate surface around a fill hole, but in some embodiments the adhesion layer may be disposed over the entire surface of the superstrate. In one embodiment, the adhesion layer may be provided as multiple layers which together constitute the adhesion layer. Similarly, an adhesion layer is provided on a first surface of a cover which will be disposed over the fill hole in the superstrate. The cover adhesion layer may be disposed over an entire surface of the cover or may be disposed over only a portion of the cover (e.g. the portion of the cover which will contact the superstrate adhesion layer). The adhesion layers are preferably provided while the superstrate and cover, respectively, are being fabricated and coated. In one embodiment, one or both of the adhesion layers is provided as Ti—Ni—Au.

As shown in processing block 44, solder is disposed on at least one of the cover or the superstrate surface. This may be accomplished, for example, by either depositing or otherwise providing the solder on the cover or the superstrate or introducing the solder between the cover and superstrate as a preform ring. The solder may be provided from either a suitably selected substantially pure metal or an alloy. In a preferred embodiment, the solder is provided from a metal such as Indium.

As shown in processing block 45, the superstrate is mated with the substrate to form an LC cavity. Any technique known to those of ordinary skill in the art may be used to form a cavity between the superstrate and substrate. Is some embodiments, it may be desirable to form a hermetic seal between the superstrate and substrate.

As shown in processing block 46, with the cavity formed, LC material is introduced into the cavity via a fill hole in the superstrate.

Optionally, as shown in processing block 48, at least the fill hole region of the LC cell is immersed in an inert gas atmosphere. In one embodiment, the fill hole is immersed in an Argon atmosphere.

As shown in processing block 50, once the LC material appropriately fills the cavity, the cover having the adhesion layer provided thereon is disposed over the fill hole. The solder is disposed between the adhesion layer of the cover and the adhesion layer of the superstrate.

With the cover and solder in place, processing then proceeds to processing block 54 in which the solder is reflowed to provide a solder joint between the cover and the superstrate. The solder joint corresponds to a hermetic seal over the fill hole and thus the fill hole is hermetically sealed.

A preferred technique for reflowing the solder includes applying heat to the cover to reflow the solder and thus provide a hermetic seal over the fill hole. In a preferred embodiment, the LC cell is disposed on a heat sink and a heated probe is then applied to the cover to cause the solder reflow. Use of a localized heat source reflows the solder without damaging the LC.

In an alternate embodiment, the entire LC cell is heated to a temperature below the melting point of the solder. Then, heat is applied to the cover to reflow the solder to thus provide a hermetic seal over the fill hole. The cover may be heated via application of a heated probe.

In one embodiment, solder is provided as Indium and the cover is placed over the fill hole in an Argon atmosphere. The LC cell is then heated to a temperature below the melting point of Indium. A heated probe is brought down on the cover causing the Indium to reflow, thereby providing a hermetic seal over the fill hole.

It should be appreciated that to facilitate solder reflow, the material from which the cover is provided is preferable selected having a thermal conductance which is not substantially lower (and preferably not lower) than a thermal conductance of the superstrate. The thermal conductance of the cover should be selected to be appropriate meaning that it should not be selected to make the solder reflow process difficult. In one embodiment, the material from which the cover is provided is selected having a thermal conductance which is not lower than a thermal conductance of the superstrate or substrate.

This technique results in a hermetic seal in which only inert materials are in contact with the LC. In applications in which the LC cell is immersed in an Argon atmosphere, the combination of the localized heating and Argon atmosphere provides the inert chamber and seal. The Argon atmosphere reduces and in some cases may even prevent oxidation or any long term reactions with the LC. The Argon also fills the expansion chamber and allows the LC to expand without distorting the cell. Utilizing a hermetic seal (achieved through the use of an indium soldered cover) and technique in which only inert materials are in contact with the LC is necessary with high performance liquid crystals that are not robust against contamination.

Figure 5:
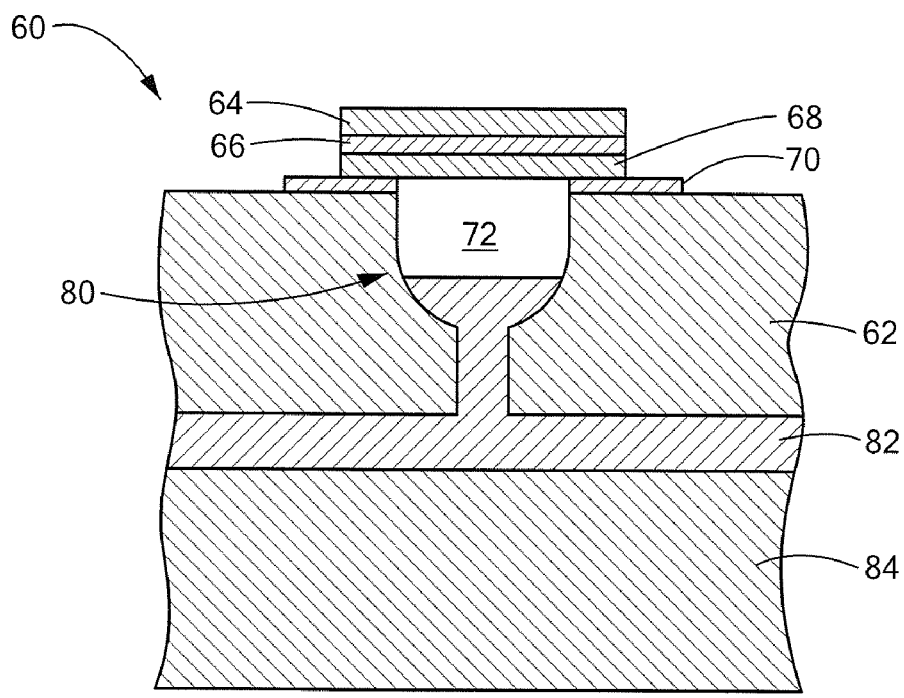
FIG. 5 is a cross-sectional view of an alternate embodiment of a hermetically sealed fill hole in a liquid crystal (LC) cell.

Referring now to FIG. 5, in an alternate embodiment, an LC cell having a hermetic seal includes a superstrate 62 and a cover 64 with an adhesion layer 66 disposed thereon. An adhesion layer 70 is disposed on a surface of the superstrate 62 about a fill hole 72. A reflowed solder 68 provided between cover adhesion layer 66 and superstrate adhesion layer 70 provides a hermetic seal between superstrate 62 and cover 64.

Fill hole 72 is provided having a counterbore region 80 to thus provide the fill hole having a volume sufficient to accept expansion of liquid crystal material 82. Substrate 84 provides a portion of the cavity in which the liquid crystal is disposed.

In one embodiment, a surface of superstrate over which the cover is disposed is polished (e.g. using a diamond grinding process) and a Ti/Ni/Au adhesion layer is evaporated onto both the superstrate and cover to provide adhesion layers 66, 70. Indium is them evaporated onto the cover over adhesion layer 66 to thus provide solder 68. In one embodiment, eight microns of solder are evaporated onto the cover. Once the liquid crystal material fills the cavity, the cover is pressed over the fill hole and is heated to reflow the Indium solder and provide a hermetic Indium seal between superstrate 62 and cover 64.

Figure 6:
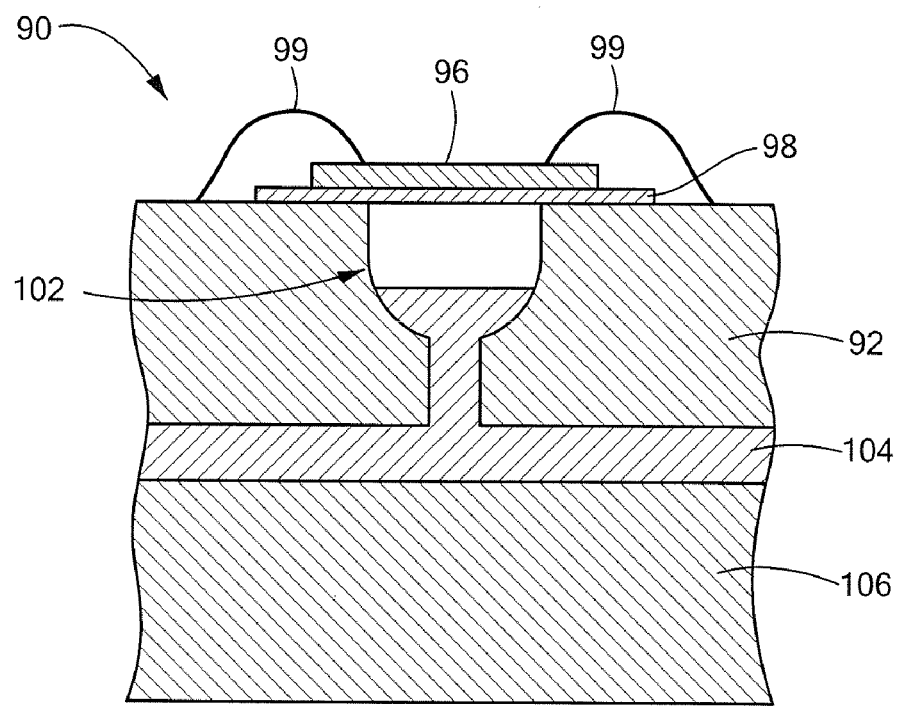
FIG. 6 is a cross-sectional view of an alternate embodiment of a hermetically sealed fill hole in a liquid crystal (LC) cell.

Referring now to FIG. 6, in yet another alternate embodiment, an LC cell 90 having a hermetic seal includes a superstrate 92 having a cover 94 disposed thereover. Reflowed solder 98 is disposed between cover 96 and superstrate 92. A blue light epoxy 99 is disposed over portions of the cover, solder and superstrate and the combination of the solder 98 and blue light epoxy 99 provides a hermetic seal over fill hole 102.

Fill hole 102 is provided having a counterbore region to thus provide the fill hole having a volume sufficient to accept expansion of liquid crystal material 104. Substrate 106 provides a portion of the cavity in which the liquid crystal is disposed.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A liquid crystal (LC) cell (10) comprising:
   a substrate (14) having first and second opposing surfaces;
   a superstrate (12) having first and second opposing surfaces and having a fill hole (16) provided therein with the fill hole having an aperture in both the first and second surfaces of said superstrate, said superstrate disposed over said substrate;
   a superstrate adhesion layer (34) disposed on the first surface of said superstrate about the fill hole;
   one or more spacers (24) disposed between said superstrate and said substrate to space apart a surface of said substrate from a surface of said superstrate;
   a sealant material (15) disposed on said superstrate and said substrate so as to form a cavity region (21) between said superstrate and said substrate;
   a liquid crystal material (22) disposed in the cavity region between said superstrate and said substrate;
   a cover (17) having first and second opposing surfaces with the first surface having a cover adhesion layer (32) disposed thereon and with the first surface of said cover disposed over the fill hole such that at least a portion of the first surface of said cover having the adhesion layer disposed thereon is in contact with at least a portion of the surface of said superstrate having the superstrate adhesion layer disposed thereon; and
   a solder material disposed between the first surface of said cover and the surface of said superstrate having the superstrate adhesion layer disposed thereon.

2. The LC cell of claim 1 wherein the fill hole is provided having a diameter selected such that the volume of the fill hole accommodates an expected expansion of the LC material when said LC material is heated to within a predetermined range of temperatures.

3. The LC cell of claim 1 wherein the LC material fills the cavity region and at least a portion of the fill hole in said superstrate.

4. The LC cell of claim 1 wherein the solder material is provided as one of: a solder layer; or a solder preform.

5. The LC cell of claim 4 wherein the solder material is provided as one of: an alloy; or a pure metal.

6. The LC cell of claim 1 wherein the cover adhesion layer is provided as Ti—Ni—Au.

7. The LC cell of claim 1 wherein the superstrate adhesion layer is provided as Ti—Ni—Au.

8. The liquid crystal (LC) cell of claim 1 wherein at least a portion of the fill hole in said superstrate corresponds to a counter-bore.

9. The liquid crystal (LC) cell of claim 1 wherein the cover is provided from a material having a coefficient of thermal expansion which substantially matches a coefficient of thermal expansion of said superstrate.

10. The liquid crystal (LC) cell of claim 9 wherein the cover and the substrate are provided from substantially the same material.

11. The liquid crystal (LC) cell of claim 9 wherein the cover and the substrate are provided from different materials.

12. The liquid crystal (LC) cell of claim 9 wherein the cover is provided from one of:
   a material having a thermal conductance which is not lower than a thermal conductance of said superstrate;
   a material having a thermal conductance which is not lower than a thermal conductance of said superstrate or said substrate; and
   a material having a thermal conductance which is not lower than a thermal conductance corresponding to a thermal conductance of the combination of the thermal conductance of said superstrate, said substrate and said liquid crystal.

13. The liquid crystal (LC) cell of claim 9 wherein the cover is provided from one of:
   a material having a thermal conductance which is not more than twenty percent lower than a thermal conductance of said superstrate;
   a material having a thermal conductance which is not more than twenty percent lower than a thermal conductance of said superstrate or said substrate; and
   a material having a thermal conductance which is not more than twenty percent lower than a thermal conductance corresponding to a thermal conductance of the combination of the thermal conductance of said superstrate, said substrate and said liquid crystal.

14. A process for forming a hermetic seal on a liquid crystal (LC) cell comprising:
   (a) providing a superstrate adhesion layer around a fill hole provided in a superstrate;
   (b) providing a cover adhesion layer on a surface of a cover;
   (c) providing solder on at least one of: the surface of the cover having the cover adhesion layer disposed thereon; and the surface of the superstrate having the superstrate adhesion layer disposed thereon;
   (d) mating the superstrate with a substrate to form an LC cavity between a surface of the superstrate and a surface of the substrate;
   (e) filing the cavity with an LC material through the fill hole in the superstrate;
   (f) disposing the cover over the fill hole in the superstrate such that the cover adhesion layer is disposed over the superstrate adhesion layer; and
   (g) operating on the cover adhesion layer and the superstrate adhesion layer such that the adhesion layers form a hermetic seal over the fill hole.

15. The process of claim 14 further comprises wherein operating on the cover adhesion layer and the superstrate adhesion layer comprises:
   (g1) mounting the LC cell on a heat sink; and
   (g2) heating the solder to form a hermetic seal over the fill hole.

16. The process of claim 14 wherein the cover adhesion layer is provided as Ti—Ni—Au and the superstrate adhesion layer is provided as Ti—Ni—Au and wherein the process further comprises disposing Indium on at least a portion of a surface of a first one of the cover and the superstrate and wherein operating on the cover adhesion layer and the superstrate adhesion layer comprises:
   (g1) mounting the LC cell on a heat sink; and
   (g2) heating the Indium to form a hermetic seal over the fill hole.

17. The process of claim 14 wherein operating on the cover adhesion layer and the superstrate adhesion layer comprises:
   (f1) heating the LC cell; and
   (f2) heating the solder to form a hermetic seal over the fill hole.

18. The process of claim 14 wherein the cover adhesion layer is provided as Ti—Ni—Au and the superstrate adhesion layer is provided as Ti—Ni—Au and wherein the process further comprises disposing Indium on at least a portion of a surface of a first one of the cover and the superstrate and wherein operating on the cover adhesion layer and the superstrate adhesion layer comprises:
- (f1) heating the LC cell to a temperature below the melting point of the solder; and
- (f2) applying a focused heat source to reflow the solder to provide a hermetic seal over the fill hole.

19. The process of claim 18 wherein applying a focused heat source comprises applying a heated probe to the cover.

20. The process of claim 14 comprising immersing the fill hole in an Argon atmosphere prior to disposing the cover over the superstrate.

21. The process of claim 14 wherein the adhesion layers are provided while the superstrate and cover are being fabricated and coated.

22. The process of claim 14 wherein disposing solder on at least a portion of a surface of the cover comprises disposing on at least a portion of a surface of the cover at least one of: (a) a pure metal; (b) Indium; or (c) an alloy.

23. The process of claim 14 wherein disposing Indium on at least a portion of a surface of the cover comprises disposing the Indium on the surface of the cover as a pre-form ring.

* * * * *